(12) United States Patent
Meyers et al.

(10) Patent No.: US 8,010,058 B2
(45) Date of Patent: Aug. 30, 2011

(54) SYSTEM AND METHOD FOR USING METEOR BURST COMMUNICATIONS IN A CONTAINER TRACKING SYSTEM

(75) Inventors: Richard C. Meyers, Arlington, VA (US); Roy Smith, Arlington, VA (US)

(73) Assignee: System Planning Corporation, Arlington, VA (US)

( * ) Notice: Subject to any disclaimer, the term of this patent is extended or adjusted under 35 U.S.C. 154(b) by 952 days.

(21) Appl. No.: 11/598,825

(22) Filed: Nov. 14, 2006

(65) Prior Publication Data

US 2007/0115114 A1    May 24, 2007

Related U.S. Application Data

(60) Provisional application No. 60/735,886, filed on Nov. 14, 2005.

(51) Int. Cl.
*H04B 1/40* (2006.01)

(52) U.S. Cl. .................. 455/88; 455/7; 455/15; 455/16; 455/69; 455/505

(58) Field of Classification Search ................ 455/7, 15, 455/16, 69, 505, 88
See application file for complete search history.

(56) References Cited

U.S. PATENT DOCUMENTS

| | | | | |
|---|---|---|---|---|
| 4,630,314 | A * | 12/1986 | Smith | 455/505 |
| 4,685,149 | A * | 8/1987 | Smith et al. | 455/524 |
| 4,845,504 | A * | 7/1989 | Roberts et al. | 342/457 |
| 5,119,500 | A * | 6/1992 | Bickel | 455/15 |
| 6,714,761 | B1 * | 3/2004 | Anderson, III | 455/7 |
| 2006/0040656 | A1 * | 2/2006 | Kotzin | 455/426.2 |
| 2006/0276942 | A1 * | 12/2006 | Anderson et al. | 701/35 |
| 2008/0094209 | A1 * | 4/2008 | Braun | 340/539.13 |
| 2009/0237237 | A1 * | 9/2009 | Brosius | 340/539.13 |

* cited by examiner

*Primary Examiner* — Charles Appiah
*Assistant Examiner* — Mazda Sabouri

(57) ABSTRACT

A system and method for communications between a plurality of shipping containers and a central monitoring station using a meteor burst communication method is provided. The system may also be used as a redundancy scheme as a backup communications device for a primary satellite or cellular channel. The channel also uses an error protection protocol, and proposes a method to conserve battery power for the system.

8 Claims, 3 Drawing Sheets

SYSTEM AND METHOD FOR USING METEOR BURST COMMUNICATIONS IN A CONTAINER TRACKING SYSTEM

CLAIM OF PRIORITY

The present invention claims priority to U.S. Provisional Patent Application No. 60/735,886, filed Nov. 14, 2005.

BACKGROUND OF THE INVENTION

1. Field of the Invention

The present invention relates generally to container security and supply chain management and, more particularly, to the communications systems used by a shipping container security system.

2. Background of the Invention

In today's security conscious transportation environment, there is a strong need to cost-effectively and accurately monitor the contents of containerized shipments. This need exists both in the United States and abroad.

Despite the strong need, until recently few solutions, if any, have been able to provide the protection and accuracy needed to suit the transportation industry and the government agencies charged with monitoring shipments. This lack of an acceptable solution is due to many factors which complicate interstate and international shipping. Shipping containers are used to transport most of the commerce entering, leaving, and transiting or moving within the United States. It is estimated that there are over 6 million containers moving in global commerce. Shipping containers have revolutionized the transportation of goods by greatly reducing the number of times goods must be loaded and unloaded during transport. However, at the same time, this same advantage has created a major problem in that it is very difficult to monitor and track the contents of each container during transport.

Beyond their basic construction, monitoring the content of shipping containers is also difficult because these containers are carried through numerous transit points and depots all over the world and it is impractical to stop and check the contents of each container individually at each point of transit. Dealing with this problem, the U.S. Customs Service estimates it can inspect just 5% of the 6 million containers entering and reentering the U.S. each year. Accordingly, agencies such as the United States Customs Service are seeking improved ways to achieve cargo container security and integrity upon arrival at the ports of entry of the United States.

A container tracking system must be able to monitor the location, contents or bill of lading, and the data from any number of sensors to detect tampering or compromise of any given container. In order to accomplish this, each container in the system may be equipped with a mechanism to collect, analyze, and communicate this data to a central collection and processing location. However, the communication of this data over long distances via wireless methods is often problematic using conventional methods due to the lack of existing infrastructure such as cellular towers and even in some cases satellite coverage. For example, even some of the largest mobile satellite communication systems have coverage gaps which do not allow communications in these areas. In addition, where satellite coverage is available and a clear look angle to the satellite is provided, it is often quite expensive to lease satellite transponder capacity which can render these types of systems economically impractical, especially when more than a few messages are sent per day.

In these cases an alternative communication method can be used which can communicate over the horizon and long distances know as meteor burst communications. Meteor burst communication was discovered roughly 50 years ago initially for military communications use. It uses the millions of particles, tiny "meteors" 1 gram or larger, that burn up in the atmosphere 50 to 75 miles above the earth as they enter the earth's gravitational field. These tiny particles are present for a short period of time and create ion paths, and the particle and resultant path may be used to relay radio signals via scattering effects back to the earth a similar manner that a conventional satellite would. Meteor burst allows communication to occur between sites up to 1200 miles away without any other terrestrial or satellite based infrastructure. Once a transmission is made, the remote station data is usually checked and an acknowledgment message is sent over the same path and the central hub station. The entire transmission protocol usually occurs in less than 100 ms. While a reliable path is not always available when the data is first ready to be transmitted, statistical measurement and atmospheric models have demonstrated that meteor burst can be extremely reliable.

In the case of container security, it would be highly advantageous for a communications system to avoid reliance on foreign cellular networks or public use satellite systems. In addition, the cost benefits of avoiding a recurring satellite space segment or cellular network usage charge could be quite significant in large numbers.

Thus, a solution is needed that provides a safe and reliable alternative method of communication using meteor burst communication techniques when the cellular and satellite communication are not practical or available.

DESCRIPTION OF THE RELATED ART

A container security system as described by System Planning Corporation (SPC) (U.S. Pat. No. 7,098,784) herein referred to as "the SPC Invention", performs many of the functions to monitor containers, their content, and to detect tampering within a container during transit. This is accomplished through a device which is located on a container and performs multiple functions. Some of these functions may include controlling various sensors, collecting the data from these sensors and transmitting this data back to a central monitoring station. The central monitoring stations may also send commands and information to individual containers equipment with this device.

To enable information to be transmitted to and from the container, there are several communications subsystems including a satellite or cellular communications device, or both. The system utilizes the satellite or cellular communications channel to communicate and send status and alarms to a central monitoring station, as well as relay information collected from the sensors, location, and other information related to the container back to a central monitoring station located in a different geographical area, in most cases some distance away.

In some cases the satellite or cellular communications channel as described in the above invention by SPC is not capable of providing reliable communications. This may occur for the satellite mode when a container does not have a direct line of sight to an overhead satellite, or a there is some obstruction where the satellite link cannot be closed.

On the cellular side, this may also occur because of weak or no radio frequency signals at all, if a particular container may be or out of range of a cellular tower or base station.

The limitation of this and other inventions is that they rely on existing infrastructure for critical communications. In many cases this infrastructure being cellular towers, or satellites with proper coverage may not be available and the system will not work. In addition, due to the sensitivity and critical nature of the information sent over this system, it may not always be preferable to use foreign satellite or cellular networks for reasons of security. Finally, service fees especially for satellite can significantly increase the cost of operation, especially when more than a few messages are sent per day.

SUMMARY OF THE INVENTION

To address the problem and limitations noted above, a system which can provide an alternative communications path over long distances from any given container to the central monitoring station is provided.

The preferred embodiments of this invention include a meteor burst transmitter and receiver used in a container monitoring and security system application.

Meteor burst communications is a technique that allows communications over long distances without the need for orbiting satellites or other wireless infrastructure. This technique exploits natural phenomena of small particles entering the earth's atmosphere and creating an ionized path as a reflective means for transmitted signals. Also since no equipment has to be placed in orbit, it is not susceptible to satellite failure, satellite ephemeris and orbit corrections, and conventional/nuclear war side-effects.

The accompanying drawings, which are incorporated in and constitute a part of this specification, illustrate various embodiments of the invention and, together with the description, serve to explain the principles of the invention.

DESCRIPTION OF THE PREFERRED EMBODIMENTS

The present invention provides a unique system for providing more robust communications for systems which monitor and report environmental information regarding the status of a plurality of shipping containers.

Throughout this specification, preferred embodiments of the invention are described in detail below with reference to the accompanying drawings. In the embodiments, various examples and illustrative embodiments are provided. It should be understood that these embodiments and examples are provided purely for purposes of illustration. The present invention is limited solely by the claims appended hereto.

Since embodiments of the present invention comprise using meteor burst communications in the container security application as opposed to the communications technique itself, theory and implementation specifics of meteor burst are not described in detail herein. Examples of suitable implementation techniques may be found for example in the text "Meteor Burst Communications: Theory and Practice" by Donald L. Schilling.

Figure 1:
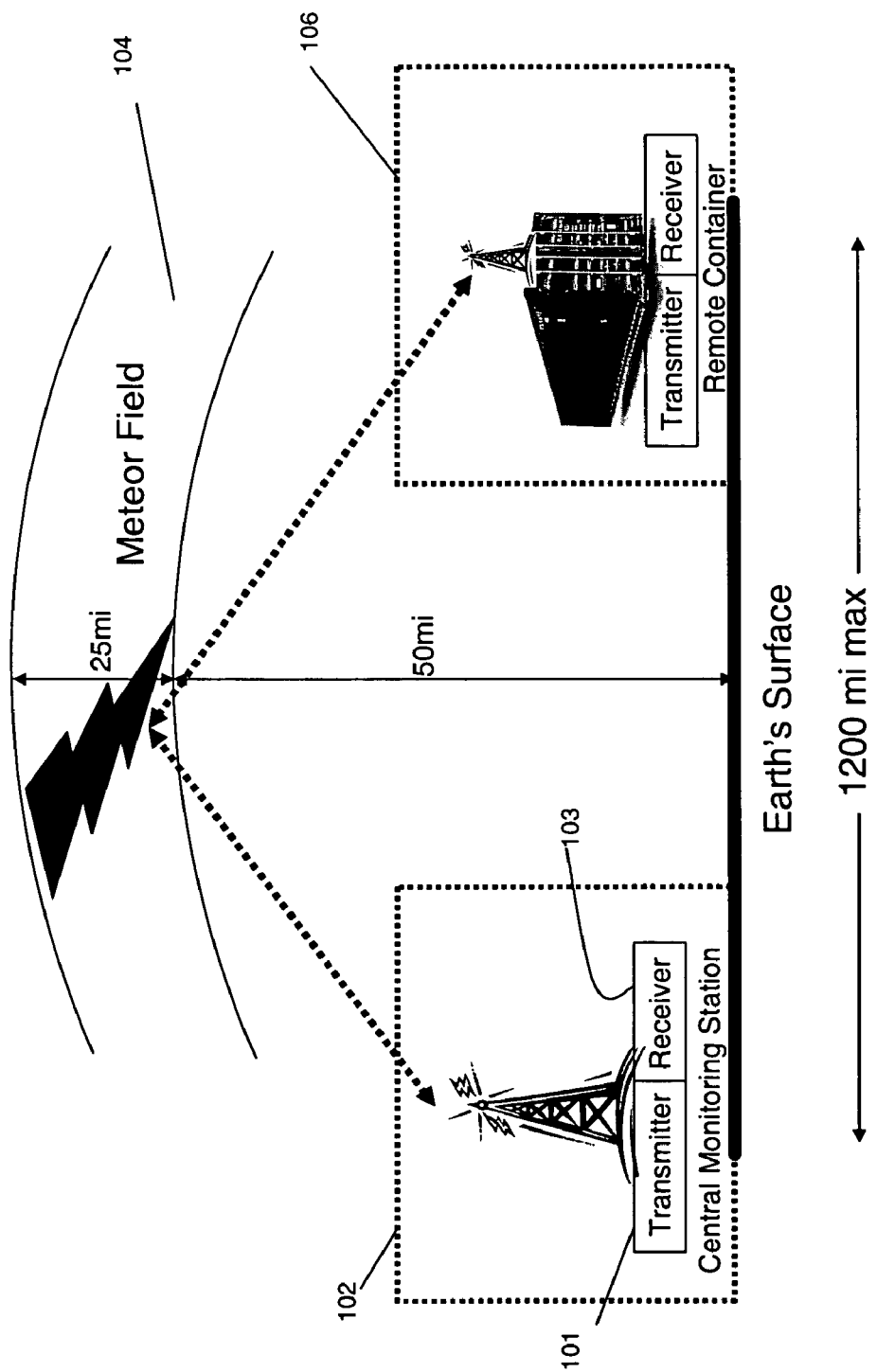
FIG. 1 shows a functional configuration of the container monitoring system using the meteor burst application.

With reference now to FIG. 1, and for the purposes of explanation, tiny particles which form a meteor field 104, enter the area of the earth's atmosphere approximately, but not limited to an altitude of between 50 and 75 miles, and result in the temporary ability for radio signals to transmitted in the direction of this field be scattered back toward earth. This phenomenon is known as meteor burst and is more clearly described in the noted reference of Schilling. The meteor burst communications device consist of the transmitter 101 and a complementary receiver 103. In a given a valid time interval when the meteor field path may allow a valid communications path, a central monitoring station 102 using the meteor burst communication method, may transmit radio frequency signals to a container 106, and receive signals sent from the container 106. In the same time interval that container 106 may transmit and use this path, other containers in the monitoring network may also transmit and receive radio frequency signals to and from the central monitoring station 102.

As an alternative, the meteor burst communications system in the preset invention may also be used as a secondary or backup channel, providing redundancy to a primary conventional satellite or cellular communications device.

The transmission range of the meteor burst communication technique is limited to a distance of approximately 1200 statute miles. In some cases this distance may not be sufficient to reach the central monitoring station. For these cases a system may be used, wherein the transmission from any given container is relayed though either another container in range, or through dedicated relay station.

Figure 2:
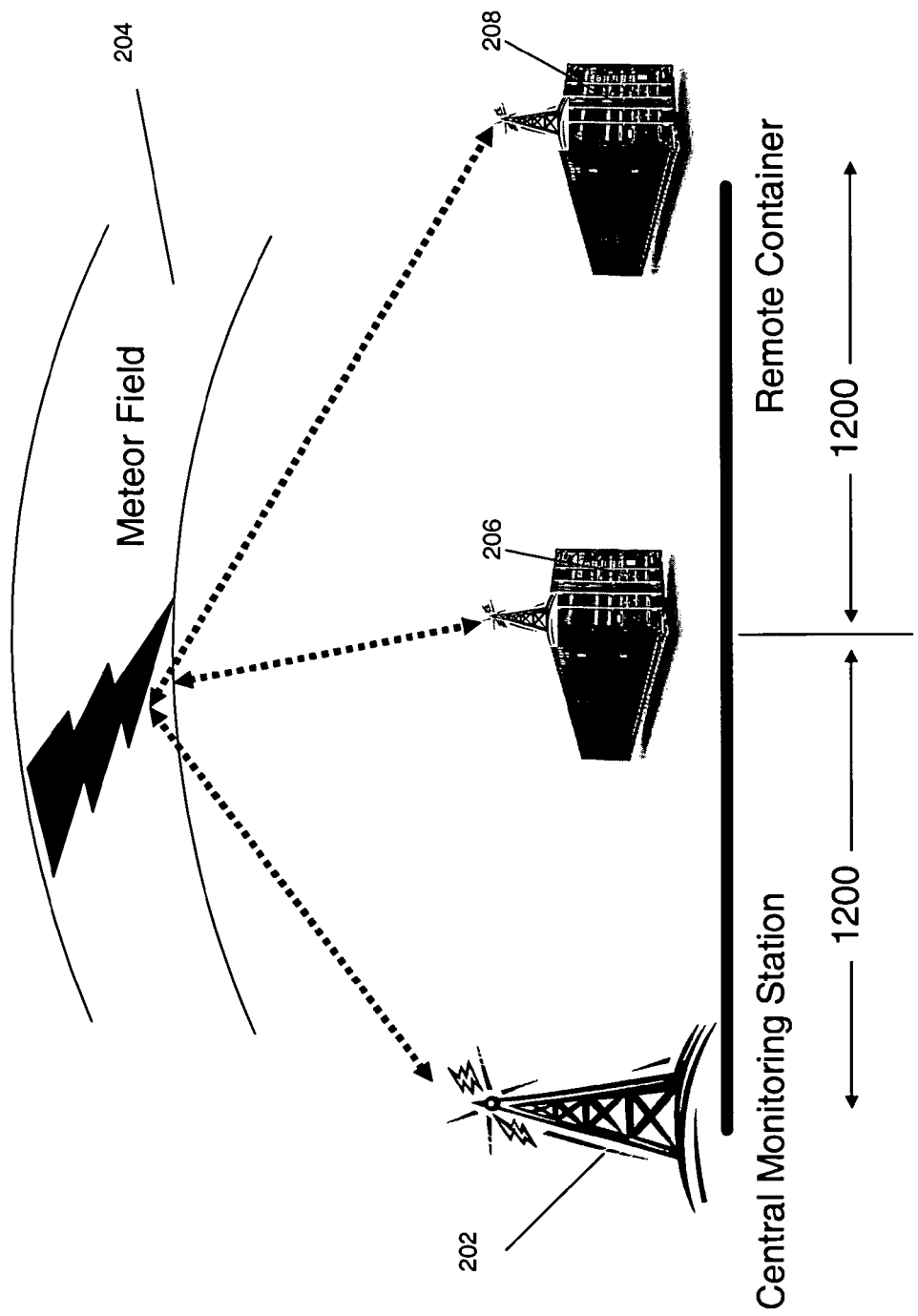
FIG. 2 shows the container monitoring system using the meteor burst application in a relay mode.

As shown in FIG. 2, a central monitoring station 202 transmits a message to a container 206, which in turn relays this message to a container 208 which is the final destination. FIG. 2 additionally illustrates implementation of a meteor field 204. In the displayed embodiment, the central monitoring station 202 is illustrated as being located 1200 miles from the container 206 and the container 208 is illustrated as being located 1200 miles from the container 206.

Since meteor burst communications is based on natural phenomena which occur at somewhat random times, it is possible that complete messages may not be received during the short transmission windows when the phenomena occurs. As such, a preferred embodiment of the present invention may use a method for providing error protection, wherein, an error detection and correction protocol may be used to verify that the transmissions using the meteor burst communication technique in a container security application are successful. Since embodiments of the present invention comprise using error protection methods for meteor burst communications in the container security application, the detailed theory and implementation specifics of said error protocols are not described in detail herein. While there are many variations of error protection techniques, at the most basic level a simple message acknowledgement scheme would suffice. Examples of suitable implementation techniques may be found for example in the reference of Schilling noted in the preceding paragraph as well.

A preferred embodiment of this present invention proposes a method to conserve power wherein the meteor burst communications may be performed at predefined periodic intervals, or in accordance with another selective transmission algorithm or technique, as to conserve battery life of the wireless and sensor equipment.

Figure 3:
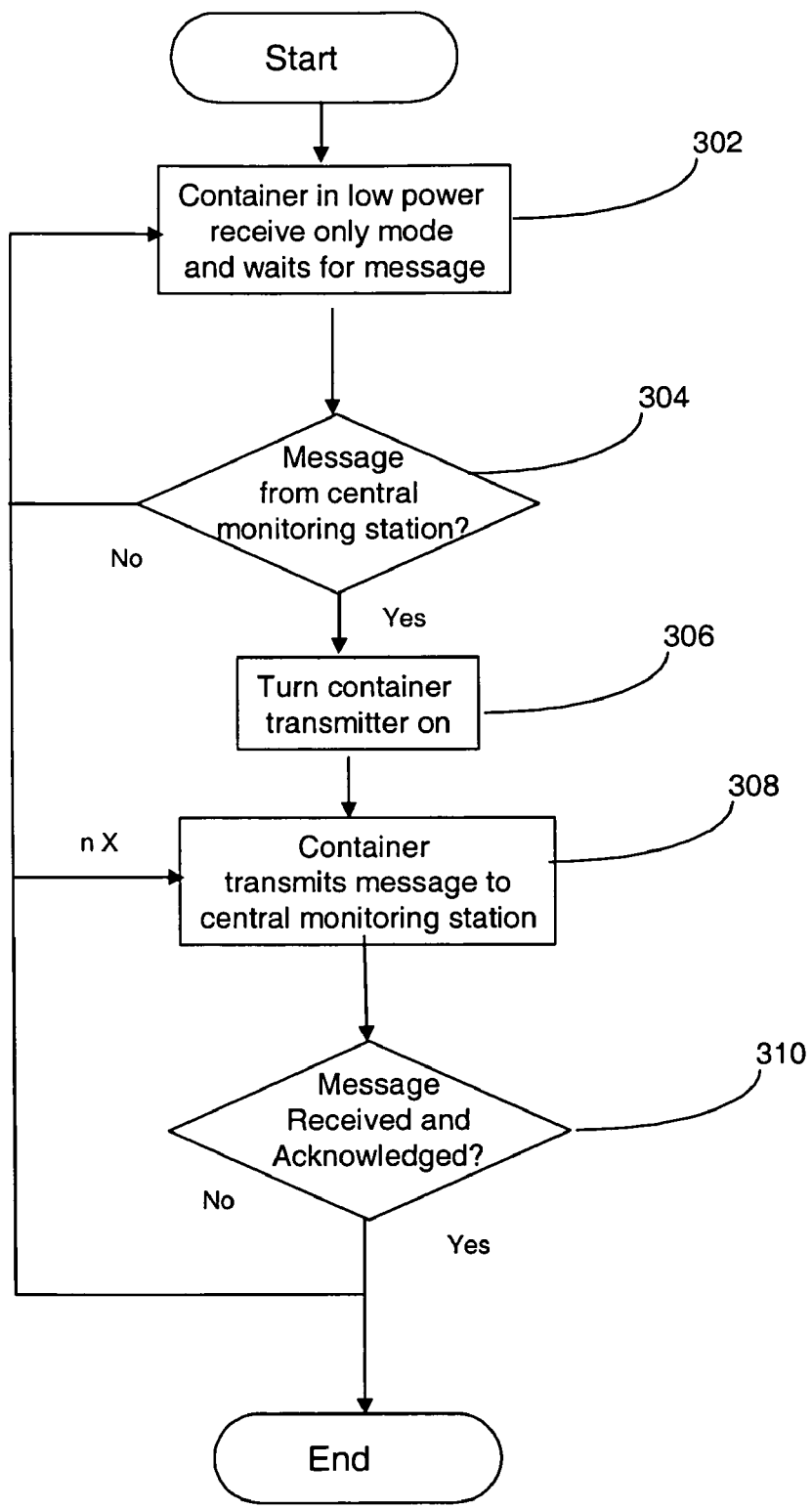
FIG. 3 shows a method for saving power in the container monitoring system using the meteor burst.

As shown in FIG. 3, a power saving method may maintain the containers, such as those containers shown in FIG. 2, in a low power meteor burst receive only mode, as illustrated at 302, listening for continuous transmission attempts from the central monitoring station. Only in 304, when such signal may be received from the central monitoring station, a protocol may be initiated at 306 on the container to turn on the higher power transmitter circuitry and complete the transmission at 308. The container may wait for an acknowledgement message back from the central monitoring station to assure that the transmission was successful. If this message is not received, the process may be repeated a predetermined number of "n" times, after which the container may return to a receive only mode at 302 waiting for the central monitoring station.

What is claimed is:

1. A system for providing communications for a container monitoring system, the system comprising:
    a first communications element for providing communications from at least one monitored container to a monitoring station;
    a second communications element comprising a meteor burst communications device for transmitting data from the monitored container to the central monitoring station via a meteor burst channel, wherein the second communications element is configured to provide an alternative transmission path between the monitored container and the monitoring station; and
    a control element which controls the first communications element and the second communications element, wherein the control element is configured to cause the first communications element and second communications element to operate in a low power mode such that the first communications element is placed in an inactive state and the meteor burst communications device is initially set to a mode to only receive incoming transmissions and further wherein the control element is configured to switch the first communications element to an active state based on the receipt of a wake-up message by the meteor burst communications device.

2. The system of claim 1, wherein the meteor burst communications device is configured to change modes and to send and receive data from a group of containers to the monitoring station.

3. The system of claim 2, wherein the meteor burst communications device is configured to transmit a wake-up signal to the control elements of multiple containers.

4. The system of claim 1, wherein the control element is further configured to actively monitor and detect inoperative transmission links in the first communications element and further wherein, the control element is configured to re-route and by-pass inoperative transmission links in the first communications system using the meteor burst channel.

5. A method for providing communications between at least one container monitoring system and a central monitoring station, wherein the container monitoring system comprises at least a first communication element, a second communication element and a control element, and further wherein the second communication element is comprised of a meteor burst communication device for transmitting data, the method comprising:
    sending and receiving messages via the first communication element;
    switching the first communication element to an inactive state and maintaining the second communications element in an active state;
    receiving data via the meteor burst communication device, wherein the meteor burst communications device is initially set to a mode to only receive incoming transmissions and not to transmit outgoing messages; and
    activating the first communication element based on the data received via the meteor burst communications device.

6. The method of claim 5, wherein the meteor burst communications device comprises an aggregate relay station, wherein the aggregate relay station is configured to send and receive information from a group of containers and to relay said information.

7. The system of claim 6, wherein the meteor burst relay station is another container in the monitoring network supporting the relay function.

8. The system of claim 7, wherein the meteor burst relay station is configured to transmit a wake-up signal to the control elements of multiple containers.

* * * * *